United States Patent
Brandt et al.

(10) Patent No.: US 9,353,470 B2
(45) Date of Patent: May 31, 2016

(54) APPARATUS AND METHOD FOR PRODUCING A FIBROUS PRODUCT

(75) Inventors: Luc Joseph Louis Brandt, Henri-Chapelle (BE); Frank Trasser, Saint Jean D'Arvey (FR); Herve Bourgeoisat, Novalaise (FR); Andre Charvet, Barberaz (FR); Christopher Clements, Johnstown, OH (US)

(73) Assignee: OCV Intellectual Capital, LLC, Toledo, OH (US)

( * ) Notice: Subject to any disclaimer, the term of this patent is extended or adjusted under 35 U.S.C. 154(b) by 122 days.

(21) Appl. No.: 14/003,013

(22) PCT Filed: Mar. 10, 2011

(86) PCT No.: PCT/IB2011/000753
§ 371 (c)(1),
(2), (4) Date: Oct. 17, 2013

(87) PCT Pub. No.: WO2012/120324
PCT Pub. Date: Sep. 13, 2012

(65) Prior Publication Data
US 2014/0030453 A1      Jan. 30, 2014

(51) Int. Cl.
*B29C 35/06*  (2006.01)
*B29C 43/22*  (2006.01)
(Continued)

(52) U.S. Cl.
CPC ............ *D04H 3/073* (2013.01); *B29C 35/0277* (2013.01); *B29C 35/04* (2013.01);
(Continued)

(58) Field of Classification Search
CPC ...... A24D 3/0233; B29C 35/02; B29C 35/04; B29C 35/0277; B29C 43/224; B29C 43/228; B29C 43/48; B29C 2043/3455; B29C 2043/5076; B29C 2043/561; B29C 67/249; B29C 70/52; B29C 70/525; B29C 70/527; B29C 70/526; B29C 70/528
See application file for complete search history.

(56) References Cited

U.S. PATENT DOCUMENTS 2,571,334 A * 10/1951 Browne ................ D04H 1/005
                                                       156/183
2,609,312 A *  9/1952 Farrell ................. B29D 23/001
                                                       106/242
(Continued)

FOREIGN PATENT DOCUMENTS

EP         242642      8/1992
JP         S5022635    8/1975
(Continued)

OTHER PUBLICATIONS

International Search Report and Written Opinion from PCT/IB11/00753 dated Dec. 28, 2011.
(Continued)

*Primary Examiner* — Michael Tolin
(74) *Attorney, Agent, or Firm* — Calfee, Halter & Griswold LLP

(57) ABSTRACT

Method for producing a fibrous product comprising: passing a texturized yarn (10) through a first passage (12) having a first outlet (14); projecting the texturized yarn (10) from the first outlet (14), inside a chamber (20), so as to fill the chamber (20) with the texturized yarn (10), thereby forming a first segment (31) of the fibrous product; moving the first segment (31) away from the first outlet (14); and forming a second segment (32) of the fibrous product in place of the first segment (31) and contiguously to the first segment (31), as many segments as necessary being contiguously formed by repeating the above steps. Apparatus for implementing the method.

20 Claims, 3 Drawing Sheets

(51) Int. Cl.
| | |
|---|---|
| B29C 70/52 | (2006.01) |
| D04H 3/073 | (2012.01) |
| B29C 35/04 | (2006.01) |
| B29C 35/02 | (2006.01) |
| B29C 67/24 | (2006.01) |
| D04H 1/00 | (2006.01) |
| D04H 1/64 | (2012.01) |
| B29C 69/00 | (2006.01) |
| D04H 3/12 | (2006.01) |
| F16L 59/02 | (2006.01) |
| B29C 43/34 | (2006.01) |
| B29C 43/50 | (2006.01) |
| B29C 43/56 | (2006.01) |

(52) U.S. Cl.
CPC ............ *B29C 43/224* (2013.01); *B29C 67/249* (2013.01); *B29C 69/001* (2013.01); *B29C 70/526* (2013.01); *B29C 70/527* (2013.01); *B29C 70/528* (2013.01); *D04H 1/005* (2013.01); *D04H 1/64* (2013.01); *D04H 3/12* (2013.01); *F16L 59/021* (2013.01); *B29C 2043/3455* (2013.01); *B29C 2043/5076* (2013.01); *B29C 2043/561* (2013.01); *Y10T 428/13* (2015.01)

(56) References Cited

U.S. PATENT DOCUMENTS

| | | | | |
|---|---|---|---|---|
| 3,490,973 | A * | 1/1970 | Reinecke | B29C 53/24 156/156 |
| 3,552,400 | A * | 1/1971 | Berger | A24D 3/0208 131/339 |
| 3,852,009 | A | 12/1974 | Roberts et al. | |
| 3,914,080 | A | 10/1975 | Kamp | |
| 4,115,498 | A | 9/1978 | Kissell et al. | |
| 4,564,486 | A | 1/1986 | Wherry | |
| 4,569,471 | A | 2/1986 | Ingemansson et al. | |
| 5,976,453 | A * | 11/1999 | Nilsson | D02G 1/161 226/97.1 |
| 6,317,959 | B1 * | 11/2001 | Nilsson | F16L 59/14 29/455.1 |
| 6,319,444 | B1 | 11/2001 | Kirk | |
| 2008/0142295 | A1 | 6/2008 | Huff | |
| 2010/0159050 | A1 | 6/2010 | Huang et al. | |

FOREIGN PATENT DOCUMENTS

| | | |
|---|---|---|
| JP | S52104577 | 9/1977 |
| JP | S61202828 | 9/1986 |
| JP | H8506390 | 7/1996 |
| JP | 2001-505960 | 5/2001 |
| JP | 2010-513774 | 4/2010 |

OTHER PUBLICATIONS

Office action from Chinese Application No. 201180070322.8 dated Feb. 16, 2015 along with English translation of relevant portions of action.

English translation of Office action from Japanese Application No. 2013-557179 dated Jan. 19, 2015.

Communication from European Application No. 11721575.6 dated Jun. 11, 2014, 3 pgs.

* cited by examiner

APPARATUS AND METHOD FOR PRODUCING A FIBROUS PRODUCT

This application is the U.S. national phase entry of PCT/IB2011/000753 with an international filing date of Mar. 10, 2011 for APPARATUS AND METHOD FOR PRODUCING A FIBROUS PRODUCT, the entire disclosure of which is fully incorporated herein by reference in its entirety.

TECHNICAL FIELD

The present disclosure relates generally to a fibrous product and an apparatus and method for producing a fibrous product. In particular, the fibrous product may be an acoustical and/or thermal insulation product such as a pipe insulator.

BACKGROUND

Fibrous products are used for numerous industrial purposes, such as for making insulation products, structural products, reinforcement products, decorative products, etc. Insulation products include thermal insulation products, which block heat flow, and acoustical insulation products which can have either a sound-barrier quality to block the transmission of sound or a sound-absorptive quality to dissipate or absorb sound, or both a sound-barrier quality and a sound-absorptive quality. Examples of fibrous thermal and/or acoustical insulation products, are pipe insulators used to prevent heat and/or sound passage from the inside of the pipe to the surrounding air. Such pipe insulators may be used, for instance, in a muffler of an automobile exhaust system. Typically, pipe insulators are hollow tubular fibrous products made from glass wool.

One method for manufacturing a pipe insulator from glass wool comprises the following steps: manufacturing a tape of glass wool containing a binder; folding the tape into a tubular shape (by bringing the longitudinal edges of the tape into contact with each other) by means of a folding shoe through which the tape is passed, thereby forming a tube of glass wool; and advancing the tube through a mold while passing hot curing gases through the tube to cure the binder, thereby forming the pipe insulator. Typically, the glass wool tape is folded around a central mandrel, this mandrel being perforated for the passage of the hot curing gases. Such a method is disclosed, for instance, in U.S. Pat. No. 4,564,486 and U.S. Pat. No. 6,319,444.

One drawback of this method is that folding the glass wool tape into a tubular shape having a cross-section different from a circular one, may be difficult. Another drawback is that bringing and bonding the longitudinal edges of the tape together may be difficult and creates a bonding interface between these longitudinal edges, such an interface affecting the overall insulation properties of the pipe insulator.

Another method, disclosed in U.S. Pat. No. 4,569,471, comprises the following steps: providing a container consisting of an outer cylinder, a perforated inner tube and a first end cap; blowing glass wool with compressed air into the container, for filling the container with the glass wool, while sucking the air out of the inside of the container by means of a suction fan, via the perforations of the inner tube; and welding a second end cap on the container.

One drawback of this other method is that the glass wool has a natural tendency to expand and come out of the container (even when suction is applied) and, therefore, the glass wool often spreads over and soils the welding area for the second end cap.

Thus, there remains a need in the art for additional methods of producing fibrous products.

SUMMARY

According to one aspect of the present disclosure, there is provided a method for producing a fibrous product. Such a method comprises:
passing a texturized yarn through a first passage having a first outlet;
projecting the texturized yarn from the first outlet, inside a chamber delimited by a first surface, so as to fill the chamber with the texturized yarn, thereby forming a first segment of the fibrous product;
moving the first segment away from the first outlet, along a first axis; and
forming a second segment of the fibrous product in place of the first segment and contiguously to the first segment, as many segments as necessary being contiguously formed by repeating the above steps.

Such a method allows one to produce easily a fibrous product having a cross-section which may be constant and different from a circular one. More particularly, it allows one to produce easily a fibrous product with an asymmetrical cross section, a hollow cross section with multiple holes, a U-type cross-section, an annular cross-section with a slit in the cross-section, or any other suitable cross-section.

Also, with such a method, the segments of the fibrous product may be continuously formed and, therefore, the fibrous product may be continuously and rapidly produced.

It is to be noted that one or several texturized yarns may be passed and projected simultaneously from the first outlet.

It is also to be noted that the segmentation of the fibrous product may be merely a mental construction, said segments resulting from a mental discretization of the fibrous product.

In certain embodiments, the first surface, which delimits the chamber, extends substantially parallel to the first axis.

In certain embodiments, the chamber has a constant cross-section.

In certain embodiments, the first outlet rotates around the first axis, the texturized yarn being projected from the rotating first outlet. The first outlet may, for instance, rotate 360 degrees around the first axis or may have an oscillatory rotating movement around the first axis.

In certain embodiments, the segments of the fibrous product are continuously formed, the texturized yarn being continuously projected from the first outlet and the segments being continuously moved away from the outlet. Thus, the fibrous product may be continuously and rapidly produced and there is no discontinuity in the structure of the fibrous product, especially between two contiguous segments.

In certain embodiments, the first surface is defined, at least partially, by at least one moving band which moves relative to the first outlet, the segments being moved away from the outlet by the moving band. The segments may be moved by friction with the moving band and/or by projections (e.g. needles or pins) carried by the moving band, these projections penetrating into the segments and dragging them away from the outlet.

In certain embodiments, the moving band passes through a folding shoe configured to wrap the moving band around the first axis. Thus, the moving band may define, partially or totally, the first surface delimiting the chamber.

In certain embodiments, suction is applied through at least a portion of the first surface so as to draw gas out of the inside of the chamber. This allows the gas used for projecting the texturized yarn, to be drawn out of the inside of the chamber.

Moreover, suction draws the texturized yarn towards the first surface, thereby improving the contact between the texturized yarn and the first surface. When the first surface is defined by the moving band, and when the segments are moved away from the outlet by the moving band, applying suction through the moving band improves the friction between the segments and the moving band and, thus, makes the driving of the segments by the moving band easier.

In certain embodiments, the produced fibrous product is a hollow tubular product, and the chamber has a constant annular cross-section being delimited, outwardly, by the first surface and, inwardly, by at least one second surface extending substantially parallel to the first axis. The first surface delimits the outer surface of the hollow tubular product, whereas the second surface(s) delimit(s) the inner surface(s). There may be one, two or more second surfaces and, thus, one, two or more corresponding holes through the hollow tubular product. The second surface may be the outer surface of a shaft.

In certain embodiments, the second surface is defined by a shaft (i.e. the outer surface of the shaft) extending axially along a second axis which is parallel or merged with the first axis. The second surface (so, the shaft) may rotate around the second axis. The second surface may be a cylindrical surface and, more particularly, a cylindrical surface of revolution.

The rotating motion of the second surface around the second axis, may be continuous or discontinuous. In the latter case, the second surface rotates around the second axis, then stops, rotates again, etc. The rotating direction around the second axis may be different before and after a stop of the rotating motion. In addition, the velocity of rotation may be constant or varying. The rotating motion of the second surface avoids the texturized yarn to stick on this second surface.

In certain embodiments, the texturized yarn is formed by passing a multifilament yarn through a texturizing nozzle. Such a nozzle separates and entangles the filaments of the multifilament yarn, so that the yarn is texturized when emerging from the nozzle.

In certain embodiments, the texturized yarn is a continuous yarn. A continuous texturized yarn has the advantage of incorporating filaments (or fibers) so long (compared to their diameters) that they can be considered to be essentially unending. The long nature of the filaments substantially decreases the amount of free filaments that can become dislodged from the product, even under extreme service conditions. This may be interesting when using the fibrous product as a muffler in an automobile exhaust system.

Otherwise, the texturized yarn may be a chopped yarn. The texturization may occur before or after chopping. In the latter case, post chop texturizing may be done, for instance, by feeding the chopped yarn down a texturizing nozzle with a tube where the friction between the filaments and the tube walls allows the yarn to be texturized by rubbing the filaments off the yarn. The chopped texturized yarns emerging from the texturizing nozzle may be drawn into the first passage by an air educator.

In certain embodiments, a binder is added to the yarn and the binder is cured on the segments. The binder may be added to the yarn at any time, i.e. before or after the texturizing step and, if after, before or after forming the segments.

According to another aspect of the present disclosure, there is provided an apparatus for producing a fibrous product, the apparatus comprising: a first passage through which a texturized yarn is passed, the first passage having a first outlet; a first chamber delimited by a first surface; a projection system for projecting the texturized yarn from the first outlet into the first chamber, the first chamber being filled with the projected texturized yarn so as to form a first segment of the fibrous product; and a conveying system for moving the first segment away from the first outlet, along a first axis, thereby allowing a second segment to be formed in place of the first segment and contiguously to the first segment.

In certain embodiments, the first surface extends substantially parallel to the first axis.

In certain embodiments, the chamber has a constant cross-section.

In certain embodiments, the first outlet rotates around the first axis, the texturized yarn being projected from the rotating first outlet. The first outlet may rotate 360° or less, it may rotate continuously or discontinuously, and it may rotate always in the same direction or not.

In certain embodiments, the conveying system comprises at least one moving band which moves relative to the outlet, the first surface being defined, at least partially, by the moving band. In one example, the conveying system comprises a conveyor belt forming the moving band, this belt being driven by rolls. In another example, the conveying system comprises a limited length of fabric/tissue driven by a winder at the discharge side of the system.

In certain embodiments, the apparatus comprises a folding shoe through which the moving band passes, the folding shoe being configured to wrap the moving band around the first axis.

In certain embodiments, the apparatus comprises a suction device for applying suction through the first surface, so as to draw gas (usually air) out of the inside of the chamber.

In certain embodiments, the fibrous product is a hollow tubular product and the first chamber has a constant annular cross-section which is delimited, outwardly, by the first surface and, inwardly, by at least one second surface extending substantially parallel to the first axis.

In certain embodiments, at least one shaft extends axially along a second axis which is parallel to the first axis, the second surface(s) being defined by the shaft(s) (i.e. the outer surface(s) of the shaft(s)). The shaft(s) may rotate, continuously or discontinuously, around the second axis.

In certain embodiments, the apparatus comprises a texturizing nozzle for passing a multifilament yarn therethrough, in order to form the texturized yarn.

In certain embodiments, the apparatus comprises a binder injector for adding a binder to the texturized yarn, and a curing unit for curing the binder on the segments. For instance, the outlet of the binder injector may be located near the first outlet of the first passage, so that binder is applied to the texturized yarn emerging from the first passage.

In certain embodiments, the curing unit has a curing chamber and the curing chamber is adjacent to and located downstream from the first chamber. The first chamber may be integrated in the curing unit, which has the advantage (among others) of improving the apparatus compactness.

With the above method and apparatus, any kind of fibrous product may be produced, including more particularly: fibrous products having good acoustical and/or thermal insulation properties, such as pipe insulators; fibrous products having good filtration properties, such as gas or liquid filtration cartridges; or fibrous products used as catalytic converters.

According to another aspect of the present disclosure, there is provided a fibrous product of constant cross section, extending along a first axis, the fibrous product comprising a texturized yarn forming curls, these curls being superimposed while being shifted with respect to one another along a shift line, this shift line being substantially a helical line around the first axis. The helical line may extend axially along the entire axial length of the fibrous product, or only along a portion of this axial length. The texturized yarn may be a continuous texturized yarn.

Said curls are obtained by projecting the texturized yarn from said first outlet with a projection speed much higher than the rotating speed of the first outlet and the axial moving speed of said segments.

Such a fibrous product has good homogeneity and other interesting properties, such as good acoustical and thermal insulation properties. It may be used as a pipe insulator.

Other features and advantages of the proposed method, apparatus and product, will be apparent from the following detailed description referring to the accompanying drawings.

BRIEF DESCRIPTION OF THE DRAWINGS

In the drawings, like reference signs generally refer to the same parts throughout the different views. The drawings are diagrammatic and not necessarily to scale, emphasis instead generally being placed upon illustrating the principles of the invention.

DETAILED DESCRIPTION

In the following detailed description, it is referred to the accompanying drawings showing an example of apparatus according to the present disclosure. It is intended that this example be considered as illustrative only, the scope of the invention not being limited to this example.

Figure 1:
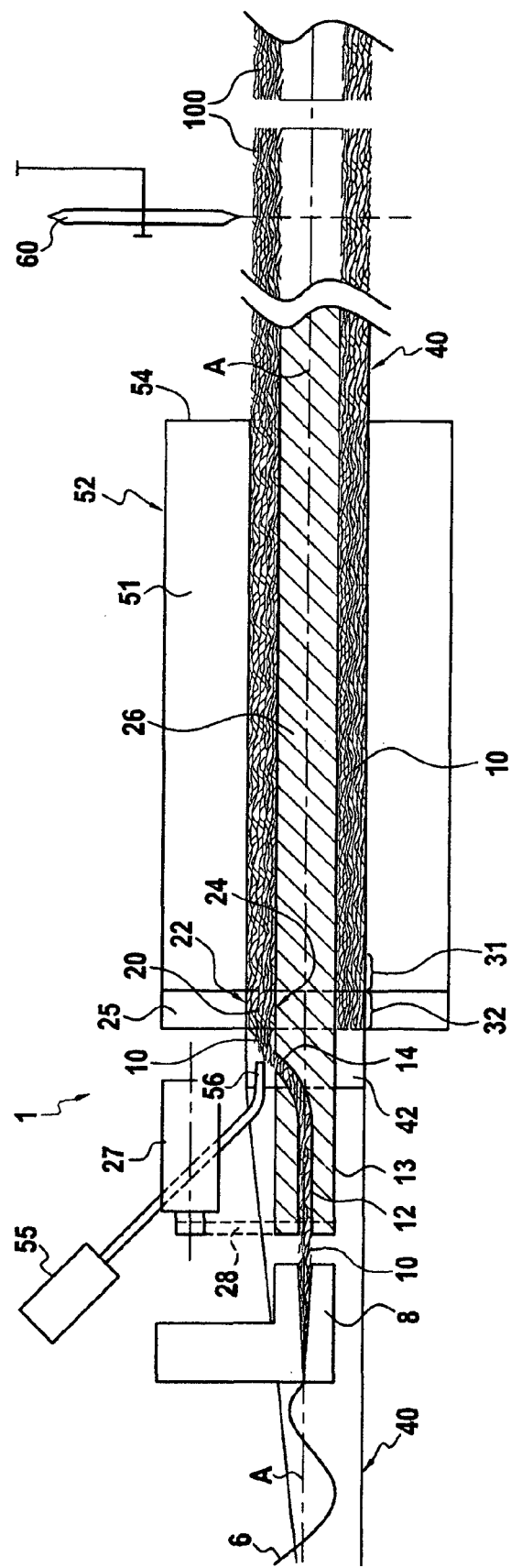
FIG. 1 is a sectional view of an example of an apparatus for producing a fibrous product of constant cross-section.
Figure 3:
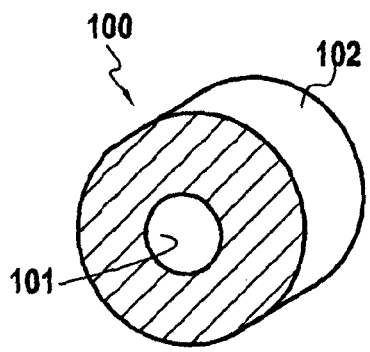
FIG. 3 is a cross-sectional view of the fibrous product produced with the apparatus of FIG. 1.
Figure 4:
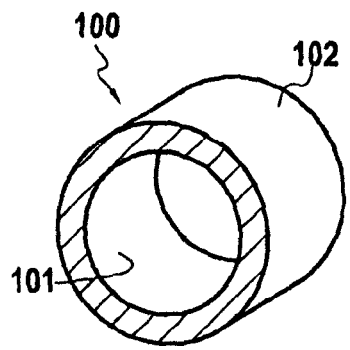
FIGS. 4 to 9 are cross-sectional views, like that of FIG. 3, of fibrous products which may be produced with other apparatuses according to the present disclosure.
Figure 5:
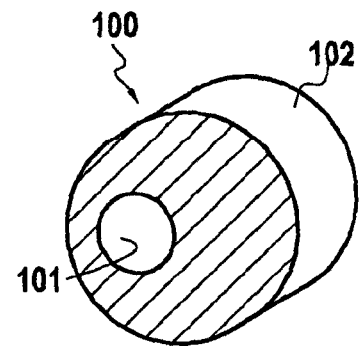
Figure 6:
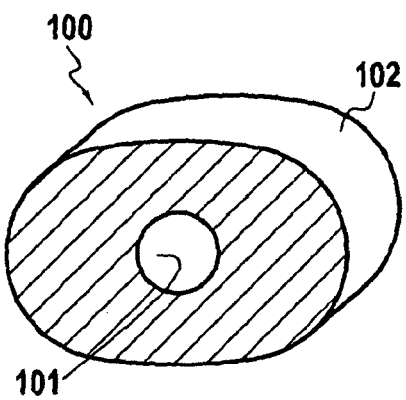
Figure 7:
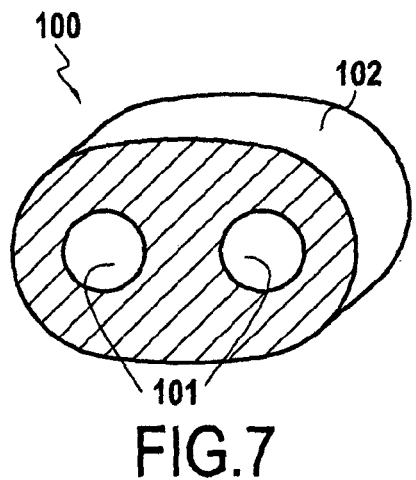
Figure 8:
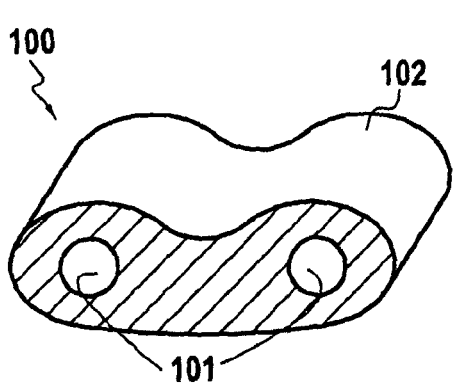
Figure 9:
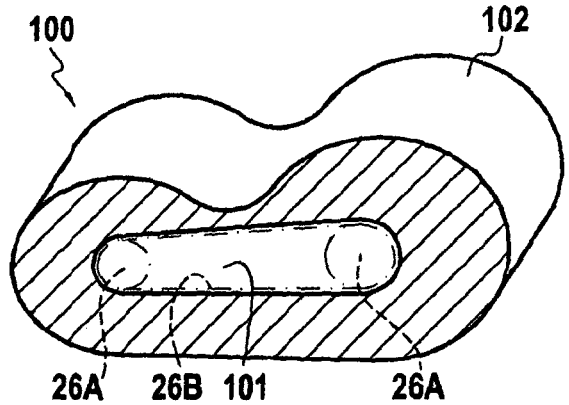

The apparatus 1 of FIG. 1 is for producing a fibrous product 100 of constant cross-section, this cross-section being shown in FIG. 3.

In the present disclosure, "upstream" and "downstream" are defined relative to the normal flow direction of the yarn and segments through the apparatus.

The apparatus 1 comprises, from upstream to downstream:
a texturizing nozzle 8,
a rotating nozzle 13 with a first internal passage 12, the first passage 12 having a first outlet 14,
a binder injector 55,
a first chamber 20,
a curing unit 52, and
a circular saw 60.

The texturizing nozzle 8 is fed with a multifilament yarn 6 made of glass filaments or fibers. This nozzle 8 is a conventional texturizing nozzle using compressed air for advancing the yarn 6 through the nozzle 8 and projecting the yarn out of the nozzle 8. The air which is blown through the nozzle 8 both imparts a forward movement to the yarn 6 and blow apart and entangle the filaments so that a texturized yarn 10 (i.e. a kind of "wool sausage") emerges from the outlet of the nozzle 8. The outlet of the nozzle 8 is located in front of the inlet of the first passage 12, so that the texturized yarn 10 is projected into the first passage 12. It is to be noted that the outlet of the nozzle 8 might also be located within the first passage 12.

Then, the texturized yarn 10 passes through the first passage 12, emerges from the first outlet 14 of the first passage 12, and is projected from the first outlet 14 into the first chamber 20 which is to be filled with the projected texturized yarn 10. The texturizing nozzle 8 is an example of projection system according to the present disclosure. Other suitable projecting systems include, but are not limited to, air blowers or air educators.

By filling the chamber 20 with the texturized yarn 10, a first segment 31 of the fibrous product is formed inside the chamber 20. The chamber 20 is of constant cross-section and is delimited by a first surface extending substantially parallel to a first axis A. The first segment 31, whose shape is delimited by the chamber 20, has a constant cross-section and a surface (here, its outer surface) which extends substantially parallel to the first axis A.

The apparatus 1 further comprises a conveying system for moving the first segment 31 away from the first outlet 14, thereby allowing a second segment 32 to be formed in place of and contiguously to the first segment 31. Thus, in FIG. 1, the first segment 31 is represented downward from the second segment 32. The conveying system comprises a moving band 40 which moves downstream relative to the first outlet 14.

Figure 2:
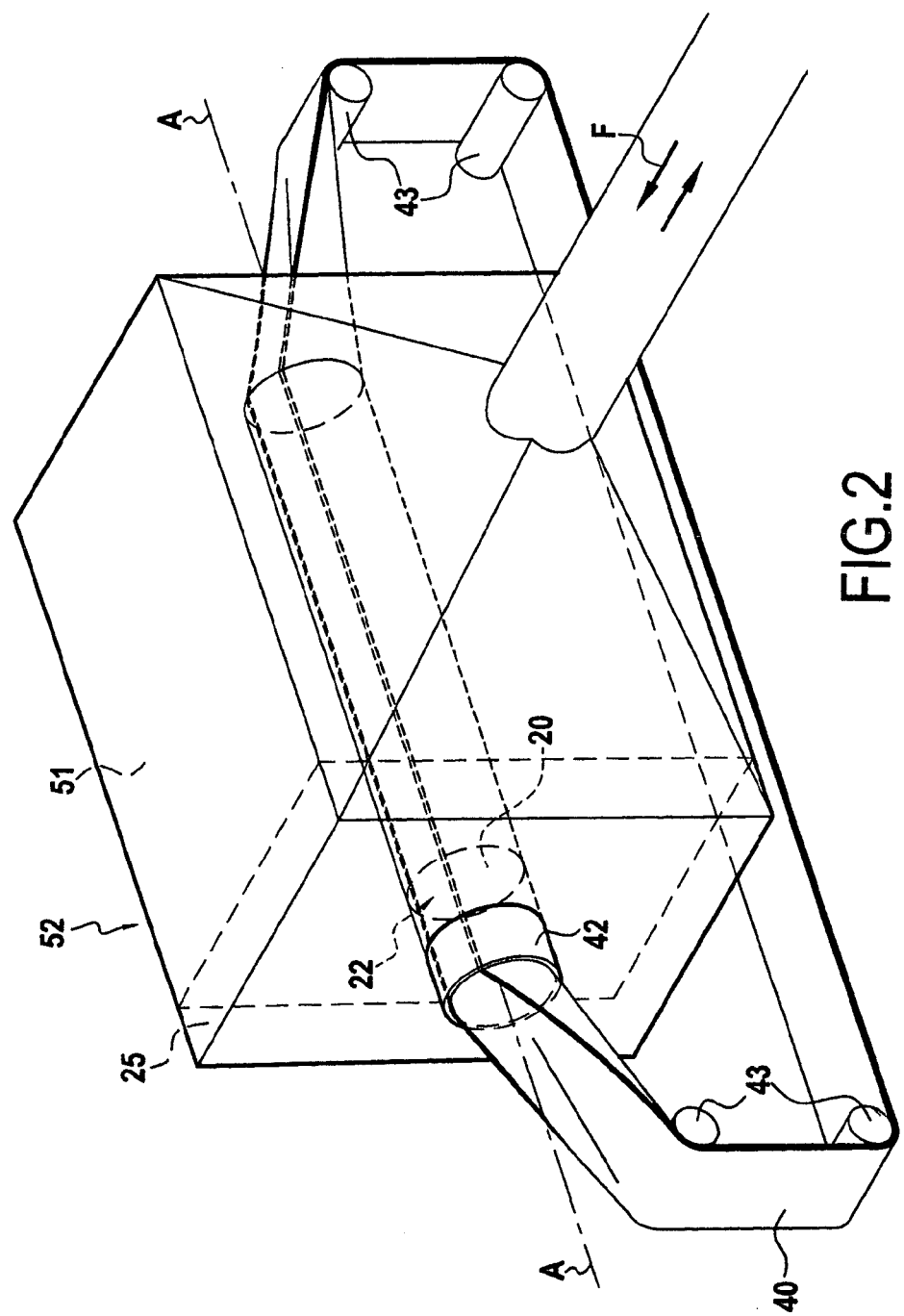
FIG. 2 is a perspective view showing the moving band and the curing unit of the apparatus of FIG. 1, the moving band passing through the curing unit.

Referring to FIG. 2, the conveying system comprises a conveyor belt 41 forming the moving band 40, the belt 41 being driven by rolls 43. The moving band 40 passes through a folding shoe 42 configured to wrap the moving band 40 around the first axis A. In this example, the folding shoe 42 is located upstream from the chamber 20, the chamber 20 being integrated in the curing unit 52. In other examples, the folding shoe is also integrated in the curing unit 52.

The apparatus 1 further comprises a shaft 26, or mandrel, extending axially along the first axis A. The outer surface of the shaft 26 extends substantially parallel to the first axis A and defines a "second surface" according to the present disclosure.

The rotating nozzle 13 revolves together with the shaft 26. In other examples, the rotating nozzle 13 and the shaft 26 may revolve independently from each other.

More particularly, the rotating nozzle 13 forms part of the shaft 26. That is, the first passage 12 is formed inside the shaft 26, the first passage 12 opening out into the upstream end face of the shaft 26, and into the outer (lateral) surface of the shaft 26. Therefore, the inlet of the first passage 12 is located on the upstream end face of the shaft 26 and the outlet of the first passage 12 is located on the outer surface of the shaft 26. Such a configuration improves the compactness of the apparatus.

In order to further improve the compactness of the apparatus, the nozzle 8 may be integrated in the rotating nozzle 13.

The shaft 26 is driven in rotation by a power train 27 with a driving belt 28. The shaft 26 may rotate, continuously or discontinuously, around the axis A and it may rotate 360° or not, depending mainly on the desired motion of the first outlet 14.

The segments 31, 32 of the fibrous product 100 are continuously formed, the texturized yarn 10 being continuously projected from the first outlet 14 and the segments 31, 32 being continuously moved away from the outlet 14, along the axis A, by the moving band 40. Accordingly, there is no concrete dividing interface between the segments 31, 32, and the fibrous product 100 has a continuous structure along its (axial) length.

The apparatus 1 further comprises a suction device 25 for applying suction through the first surface 22 of the chamber 20. Here, the first surface 22 being defined by the moving band 40, suction is applied through the moving band 40 by a sucking box surrounding the moving band 40. In this example, the suction device 25 is integrated in the curing unit 52, at the entrance thereof. The suction device 25 allows the gas used for projecting the yarn 14 (here, air), to be drawn out of the inside of the chamber 20. The amount of drawn gas being greater than the amount of incoming gas, low pressure is created inside the chamber 20 and the projected texturized yarn 14 is drawn towards the inside of the chamber 20.

The suction through the moving band 40 also allows friction to be improved between the moving band 40 and the texturized yarn 14. Thus, the segment 31, 32 made from the texturized yarn 14 is more easily driven by the moving band 40. However, in order to avoid a significant slowing down of the moving band 40, the suction needs to be limited.

The chamber 20 has a constant annular cross-section being delimited outwardly by the moving band 40 partially defining the first surface 22, and inwardly by the outer surface of the shaft 26 defining the second surface 24, both the first and second surfaces 22, 24 extending substantially parallel to the first axis A. Thus, the fibrous product 100, whose shape is delimited by the first and second surfaces 22, 24, is a hollow tubular product with an annular cross-section, as shown in FIG. 3. The cylindrical outer surface 102 of the fibrous product 100 is delimited by the first surface 22, and the cylindrical inner surface 101 of the fibrous product 100 is delimited by the second surface 24.

Therefore, depending on the shape of the first and second surfaces 22, 24, fibrous products with cross-sections as shown in FIGS. 4 to 9, may be produced. For the fibrous products of FIGS. 6 and 7, two shafts 26 are used, these two shafts delimiting two inner surfaces 101. For delimiting the outer surface 102 one or more moving bands 40 may be used. For the fibrous product of FIG. 9, two shafts 26A with a belt 26B stretched between these two shafts 26 may be used. The two shafts 26A and the belt 26B are shown in dotted line in FIG. 9.

After being projected from the first outlet 14 and before entering into the chamber 20, the texturized yarn 14 is wetted with an uncured binder. The binder is applied to the texturized yarn 14 by a binder injector 55 having its outlet 56 near the first outlet 14. The binder is the glue that, once cured, holds the filaments of the texturized yarn 14 together, in a fixed position. A typical binder, suitable for producing pipe insulators is a phenolic liquid binder, which usually requires temperatures of 200° C. or greater for curing. The binder may be a liquid based binder, usually in an emulsion or solution, or a dry binder, usually in powder form. Alternatively, the dry binder may be a thermoset polymer in fibrous form that is dispersed among the texturized yarn 14. For instance, the binder may be cured by conventional or microwave heating it to its curing temperature, by hitting it with the light waves in the long wavelength ultra violet (UV) range. Then, the binder hardens and bonds the filaments to one another.

The curing chamber 51 is adjacent to and located downstream from the first chamber 20. Both the curing chamber 51 and the first chamber 20 are integrated in the curing unit 52. Typically, in the curing chamber 51, there may be one or more heating compartments, for curing the binder on the fibrous product, and one or more cooling compartments. A system for providing gas to the curing unit 52 and/or sucking gas out of it (see the arrows F in FIG. 2) is connected to the curing unit 52. Additionally, heating elements (outer contact heaters and heat source from inside the shaft 26) may be used prior to the curing chamber 51 itself. UV-curing may also be contemplated. Curing the binder gives to the fibrous product its final structure.

The fibrous product 100 is moved out of the curing unit 52 by the moving band 40. Downstream from the curing unit 52, there is provided a cutting cell allowing the continuous fibrous product 100 to be cut at a desired length. The cutting cell comprises a circular saw 60 which continuously rotates. The saw 60 is moved radially towards the fibrous product 100 and cuts it, while moving axially along the axis A with the same linear speed as the fibrous product 100. As the cutting process is over, the saw 60 is moved back radially and axially to perform the next cut to length.

Another conveying belt may be provided downstream from the saw 60, for moving the cut fibrous product 100 further in the production line.

Another cutting cell may be provided for cutting the fibrous product 100 in the axial direction, so as to form an axial slot in the thickness of the fibrous product 100. Such a slot eases the insertion of the fibrous product 100 onto a tube to be isolated.

Further in the production line, paper or polymer sheet, shrink type wrapping may be applied.

With the above method and apparatus, a fibrous product 100 with special features may be produced by projecting the texturized yarn 10 from said first outlet 14 with a projection speed much higher than the rotating speed of the first outlet 14 and the axial moving speed of said segments 31, 32. Such a fibrous product 100 extends along the first axis A and has a constant cross section, i.e. it has the same section in any plane perpendicular to the first axis A (see examples of cross sections in FIGS. 4 to 9). The fibrous product 100 comprises the texturized yarn 10 and a binder. The texturized yarn 10 forms curls which are superimposed while being shifted with respect to one another along a shift line, this shift line being substantially a helical line that turns around the first axis A.

For instance, projection speed of the texturized yarn 10 from the first outlet 14 may vary between 50 and 600 m/min, the rotating speed of the first outlet 14 may vary between 40 and 600 r/min, and the axial moving speed of said segments 31, 32 (which corresponds to the axial moving speed of the band 40, in this example) may vary between 1 and 50 m/min.

When the first outlet 14 rotates 360 degrees around the first axis A, the helical line may extend axially along the entire axial length of the fibrous product 100. When the first outlet 14 has an oscillatory rotating movement around the first axis A, there is a succession of helical lines, each helical line extending axially along a portion of the axial length and correlating with half an oscillation.

It is to be understood that although glass fibers (or filaments) are used in the above embodiment, other fibrous material such as textile or mineral fibers (e.g. cellulose fibers, fibers of rock, slag or basalt) might be used. Besides, different types of glass fibers may be used depending on the service conditions of the fibrous product. For instance, for fibrous products used in a high-temperature environment, Advantex® glass fibers may be used. For a low-temperature environment, E-glass or Advantex® glass fibers may be used.

The above description is given by way of example, and not limitation. Given the above disclosure, one skilled in the art could devise variations that are within the scope of the invention disclosed herein. Further, the various features of the embodiments or examples disclosed herein can be used alone or in varying combinations with each other, and are not intended to be limited to the specific combination described herein.

The invention claimed is:

1. An apparatus for producing a fibrous product between a first surface and a second surface, the apparatus comprising:
    means for texturizing at least one yarn comprising a plurality of glass fibers into a texturized yarn;
    a first passage having a first outlet;
    a first chamber including the first surface and the second surface;

a shaft extending through the first chamber, wherein a surface of the shaft forms at least part of the second surface;

means for projecting the texturized yarn into the first passage, such that the texturized yarn passes through the first outlet and into the first chamber;

means for applying a binder to the texturized yarn after the texturized yarn exits the first outlet and before the texturized yarn enters the first chamber; and means for conveying a first segment of the fibrous product, formed when the texturized yarn with the binder applied thereto fills the first chamber between the first surface and the second surface, away from the first outlet, along a first axis, thereby allowing a second segment to be formed in place of the first segment and contiguously to the first segment.

2. An apparatus for producing a fibrous product between a first surface and a second surface, the apparatus comprising:

a nozzle for transforming at least one yarn comprising a plurality of glass fibers into a texturized yarn;

a first passage having a first outlet;

a first chamber including the first surface and the second surface;

a shaft extending through the first chamber;

a binder injector; and a conveying system comprising a moving band;

wherein the nozzle is interfaced with a source of compressed air for projecting the texturized yarn from the nozzle into the first passage, such that the texturized yarn passes through the first outlet and into the first chamber;

wherein the binder injector is operable to apply a binder to the texturized yarn after the texturized yarn exits the first outlet and before the texturized yarn enters the first chamber;

wherein the texturized yarn with the binder applied thereto fills the first chamber between the first surface and the second surface so as to form a first segment of the fibrous product;

wherein a surface of the moving band forms at least part of the first surface;

wherein a surface of the shaft forms at least part of the second surface; and wherein the conveying system is operable to move the first segment away from the first outlet, along a first axis, thereby allowing a second segment to be formed in place of the first segment and contiguously to the first segment.

3. The apparatus of claim 2, wherein the first surface extends substantially parallel to the first axis.

4. The apparatus of claim 2, wherein the first chamber has a constant cross-section.

5. The apparatus of claim 2, wherein the first outlet rotates around the first axis, with the texturized yarn passing through the rotating first outlet.

6. The apparatus of claim 5, wherein the first outlet continuously rotates 360 degrees around the first axis.

7. The apparatus of claim 5, wherein the first outlet rotates around the first axis at a rate between 40 rev/min to 600 rev/min.

8. The apparatus of claim 2, further comprising a folding shoe through which the moving band passes, the folding shoe being configured to wrap the moving band around the first axis.

9. The apparatus of claim 2, further comprising a suction device for applying suction through the moving band.

10. The apparatus of claim 2, further comprising a curing unit for curing the binder on the segments.

11. The apparatus of claim 2, wherein the second surface extends substantially parallel to the first axis.

12. The apparatus of claim 2, wherein the first passage is formed within the shaft.

13. The apparatus of claim 2, wherein the shaft rotates within the first chamber.

14. The apparatus of claim 2, wherein the texturized yarn is projected from the nozzle at a rate between 50 m/min to 600 m/min.

15. The apparatus of claim 2, wherein the moving band travels at a speed between 1 m/min to 50 m/min.

16. An apparatus for producing a fibrous product between a first surface and a second surface, the apparatus comprising:

a nozzle for transforming at least one yarn comprising a plurality of glass fibers into a texturized yarn;

a passage having an outlet;

a chamber including the first surface and the second surface;

a first shaft extending through the chamber;

a second shaft extending through the chamber;

a conveying system comprising a moving band;

wherein the nozzle is interfaced with a source of compressed air for projecting the texturized yarn from the nozzle into the passage, such that the texturized yarn passes through the outlet and into the chamber;

wherein the texturized yarn fills the chamber between the first surface and the second surface so as to form a first segment of the fibrous product;

wherein a surface of the moving band forms at least part of the first surface;

wherein a surface of the first shaft forms at least part of the second surface;

wherein a surface of the second shaft forms at least part of the second surface; and wherein the conveying system is operable to move the first segment away from the outlet, along a first axis, thereby allowing a second segment to be formed in place of the first segment and contiguously to the first segment.

17. The apparatus of claim 16, wherein a belt extends around the first shaft and the second shaft within the chamber, the belt forming at least part of the second surface.

18. The apparatus of claim 16, wherein the chamber has an asymmetric cross-section.

19. The apparatus of claim 16, further comprising a binder injector, wherein the binder injector is operable to apply a binder to the texturized yarn after the texturized yarn exits the outlet and before the texturized yarn enters the chamber.

20. The apparatus of claim 19, further comprising a curing unit for curing the binder on the segments.

* * * * *